Sept. 14, 1943.   J. F. PETERS   2,329,216
REGULATOR
Filed Jan. 8, 1941
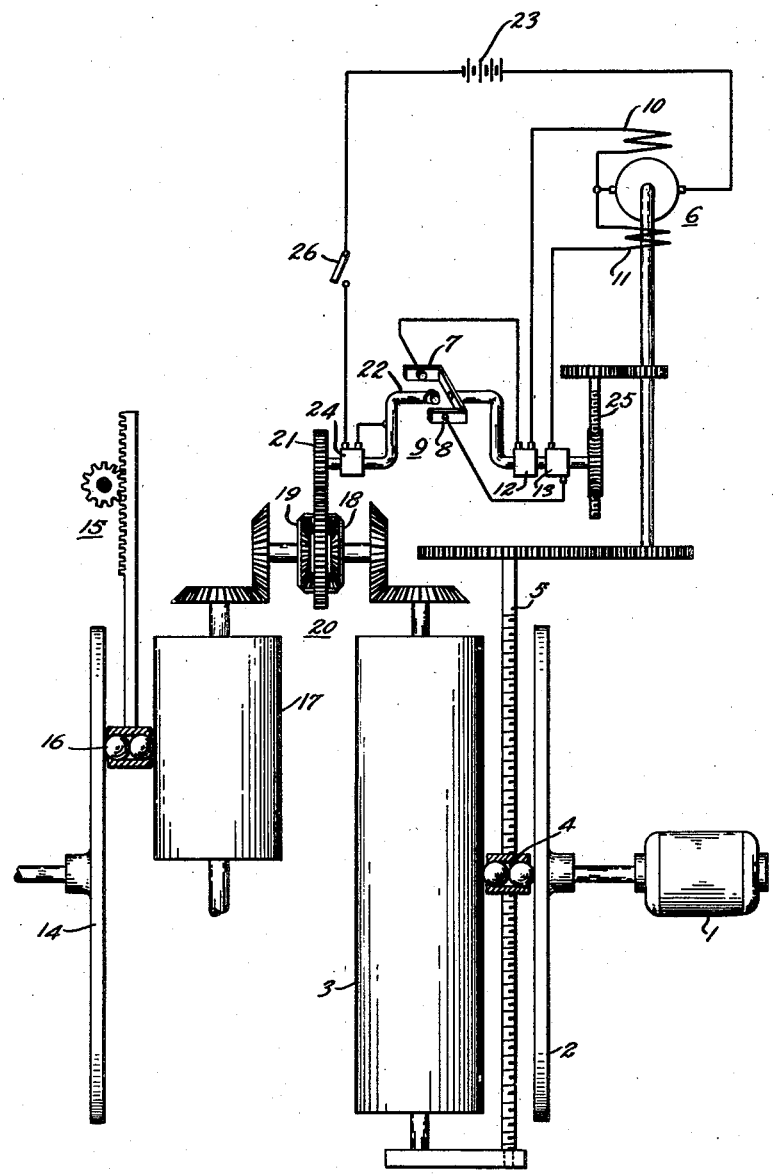
WITNESSES:
E. F. Oberheim.
Wm. J. Ruano
INVENTOR
John F. Peters.
BY
Paul E. Friedemann
ATTORNEY Patented Sept. 14, 1943

2,329,216

UNITED STATES PATENT OFFICE 2,329,216

REGULATOR

John F. Peters, Edgewood, Pa., assignor to Westinghouse Electric & Manufacturing Company, East Pittsburgh, Pa., a corporation of Pennsylvania Application January 8, 1941, Serial No. 373,700

2 Claims. (Cl. 74—388)

My invention relates to an electrical regulating device, more specifically to a regulating system for effecting matching of speeds of two rotatable members.

An object of my invention is to provide an electric regulator which is relatively simple and inexpensive but which is highly reliable in operation.

Another object of my invention is to provide an electric regulator for a speed matching system which is substantially devoid of hunting and which has a step-by-step operation.

Another object of my invention is to provide an electric regulator for driving a variable speed transmission device so as to match the speed of one rotatable member with that of another rotatable member, which regulator directly drives, to the exclusion of the variable speed means, an element of a control switch for the regulating motor so as to effect stoppage of the control movement very shortly after the regulating motor begins to rotate.

Other objects and advantages will become more apparent from a study of the following specification when considered in conjunction with the accompanying drawing, in which the figure is a schematic showing of the speed matching system including a regulator which embodies the principles of my invention.

Referring more particularly to the figure, numeral 1 denotes a constant speed motor which drives a disk 2 which, in turn, drives a cylinder 3 through a ball assembly drive 4. The speed and direction of rotation of cylinder 3 is dependent upon the radial position of ball assembly drive 4 with respect to the disk 2, which radial position is altered by rotation of the screw threaded shaft 5 in either one direction or an opposite direction. Threaded shaft 5 is mechanically geared to a regulating motor 6. There is also mechanically coupled to the regulating motor 6, a pair of contact members 7 and 8 of a reversing switch 9 which are electrically connected to each of the reversely wound field windings 10 and 11 of the motor through brush assemblies 12 and 13.

A disk 14 may be driven at a variable speed which may be an unknown speed which is to be matched. This unknown speed may, of course, vary between some unknown negative values, negative and positive values, or postive values. A variable speed transmission device, including a rack and pinion drive 15, a ball assembly drive 16 and a cylinder 17 similar to the drive hereinabove described, may be provided for the purpose of changing the speed ratio of the drive, or in other words the responsiveness of cylinder 17 to the rotative movements of disk 14. Cylinders 3 and 17 are geared through suitable bevel gears to sun gears 18 and 19 of a differential gear 20. When the speeds of gears 18 and 19 are equal and opposite, the planetary gear system of the differential remains stationary and there is no rotative output. However, when the speeds of gears 18 and 19 are different, there will be a rotation of the planetary gear assembly which will rotate a gear 21 and contact member 22 of reversing switch 9 rigidly secured thereto.

The operation of the device is as follows: Assume that cylinder 17, which in effect is the controlling element of the system, increases in speed beyond that of cylinder 3 or controlled element 3, thus causing a rotative output of differential 20 which will effect contacting relationship between contact members 22 and 7. A circuit will thus become completed which may be traced from the right-hand terminal of a suitable energizing source indicated by battery 23, through the armature of the regulator, series field winding 10, brush assembly 12, contact members 7 and 22, brush assembly 24, line switch 26 to the left-hand side of battery 23. This will effect energization of motor 6 in a direction that will cause outward radial movement of ball assembly drive 4, so that cylinder 3 will speed up. The moment the motor begins to rotate, it will drive a retrieving mechanism including worm gear 25 so as to rotate contact members 7 and 8, in the same direction as 22 at a velocity in excess of the maximum velocity of contact member 22 thereby effecting separation of contact members 7 and 22. If the speeds of gears 18 and 19 still remain different, contact member 22 will again be moved into engagement with contact member 7 so as to effect further rotation of the motor and further radial movement of ball assembly drive 4 to further increase the speed of cylinder 3 which will again be followed up by a retrieving movement of contact members 7 and 8 through the drive including worm gear 25. In this manner, it will be seen that a step-by-step regulation occurs which is substantially devoid of hunting. An outstanding feature of my invention is that the retrieving movement of contact members 7 and 8 by the motor is effected by a drive which is exclusive of the variable speed drive between disk 2 and cylinder 3. As a consequence of this arrangement, the retrieving movement of the regulating motor with respect to the contact members 7 and 8 has an anticipating function in the control system. By excluding the variable speed drive between disk 2 and cylinder 3 from this retrieving drive, there is also excluded errors which might be caused by slippage in the ball assembly drive 4, and there is excluded the tendency to overshoot or hunt which would follow such slippage. In other words, the regulating motor 6 is stopped without the necessity of awaiting a change in speed of cylinder 3 as caused by a change in ratio position of ball assembly drive 4.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. In a regulating device comprising, a control member rotated at variable speeds, a controlled member rotated at a constant speed, speed changing means for altering the value of said constant speed, and differential means actuated by both said members, a regulating system for matching the speed of said controlled member with the speed of said control member comprising, in combination, a positioning motor for controlling said speed changing means, contacting means having two cooperating contact elements for providing starting, stopping and reversing control of said positioning motor, the first of said cooperating contact elements being actuated by the output of said differential, means whereby the second of said contact elements is driven by said positioning motor upon engagement of said contacting elements at a velocity in excess of the maximum velocity of said first contact element to effect a rapid break action of said contact elements thereby preventing said speed changing means from overshooting or hunting.

2. A speed regulating system comprising, in combination, a rotatable variable speed controlling element, a controlled element, a constant speed disc, speed changing means interconnecting said constant speed disc and said controlled element for rotating said controlled element, a positioning motor, differential means operated by both said controlling element and said controlled element having an output proportional to the difference of speeds of said elements, contacting means providing starting, stopping and reversing control of said positioning motor comprising a pair of coaxially disposed relatively rotatable contacting elements, one of said contacting elements being driven by the output of said differential, means whereby the other of said contacting elements is driven by said positioning motor, when said contacting elements are in engagement, at a velocity in excess of the maximum velocity of said first mentioned contacting element, and means mechanically engaging said speed changing means with said positioning motor whereby said speed changing means may be traversed completely across, and along a diameter of, said constant speed disc to vary and reverse the speed of said controlled element as indicated by said controlling element.

JOHN F. PETERS.